United States Patent [19]

Forney

[11] 4,153,548

[45] May 8, 1979

[54] PROCESS FOR CONTROLLING POLLUTION AND CONTAMINATION IN THE ELECTRODEPOSITION OF PAINT

[75] Inventor: Steven W. Forney, Wixom, Mich.

[73] Assignee: Nalco Chemical Company, Oak Brook, Ill.

[21] Appl. No.: 590,959

[22] Filed: Jun. 27, 1975

Related U.S. Application Data

[63] Continuation of Ser. No. 436,625, Jan. 25, 1974, abandoned.

[51] Int. Cl.² ............................................. C02B 1/20
[52] U.S. Cl. ........................................ 210/52; 210/54
[58] Field of Search ................ 55/84, 85; 98/115 SB; 210/42 R, 51-54, 59, 167

[56] References Cited

U.S. PATENT DOCUMENTS

| | | | |
|---|---|---|---|
| 3,515,575 | 6/1970 | Arnold | 55/84 |
| 3,861,887 | 1/1975 | Forney | 55/85 |

OTHER PUBLICATIONS

Black, "Preparing and Using Activated Silica," *Water & Sewage Works*, 6-1956, pp. R95-R98.
Water Treatment Handbook, Degremont, pp. 116-117.

*Primary Examiner*—Thomas G. Wyse
*Assistant Examiner*—P. A. Hruskoci
*Attorney, Agent, or Firm*—Richard L. Johnston

[57] ABSTRACT

An acidic silica sol and coagulating polymer are used to reduce the tackiness of paint solids of electrodeposition paints and to condition such solids so that they can be separated and removed from the drippings and wash water obtained as a result of the application of electrodeposition paints to various types of products.

6 Claims, No Drawings

PROCESS FOR CONTROLLING POLLUTION AND CONTAMINATION IN THE ELECTRODEPOSITION OF PAINT

This is a continuation of application Ser. No. 436,625, filed Jan. 25, 1974 now abandoned.

BACKGROUND

In the application of paints by electrodeposition to automobile wheels, bodies and other types of articles, the customary process involves immersing the article in an electrodeposition paint bath to which a current is applied in order to cause the solids in said bath including resins and binders to be electrodeposited on the article. In the usual type of paint electrodeposition process the article becomes the anode and the electrodeposited solids consist essentially of negatively charged particles. In the electrodeposition of paint one type of process which is used employs an electrodeposition aqueous coating bath containing particulate pigment and polycarboxylic acid resin binder. This type of process is disclosed in U.S. Pat. No. 3,699,030 patented Oct. 17, 1972, and in various other patents referred to therein, all of which are incorporated herein by reference.

After the paint has been electrodeposited on the article the article is removed from the bath and the paint drippings and paint contained in water used to wash the article present a disposal problem. The solids are usually quite tacky and tend to cling to the floors and walls and any other surfaces with which they come into contact. This causes formation of deposits on such surfaces that are difficult to remove. Usually, the drippings and wash water containing electrodeposition paint solids are removed in any suitable manner and in order to avoid contamination of the environment it is customary to separate the solids from the water and recirculate the water but the separation of the solids is difficult by the usual method of filtration. Moreover, because of the tackiness of the solids, the removal of the waste water, including the drippings and the wash water, does not necessarily remove all of the solids from the surrounding surfaces and this makes it necessary to shut down the operation from time to time in order to clean such surfaces.

It is therefore desirable to control pollution and contamination in electrodeposition paint operations so as to prevent, as much as possible, the deposition of paint solids on surrounding surfaces which are exposed to drippings and wash water from the painted articles and to condition the sludge which is removed with the water so that it can be readily filtered and the water which forms the filtrate can be returned for further use.

OBJECTS

One of the objects of the present invention is to provide a new and improved process for controlling pollution and contamination in electrodeposition paint processes by adding to the waste water, including the drippings and wash waters from the electrodeposited articles, a combination of additives which will reduce the tackiness of the paint solids and thereby reduce the tendency of such solids to adhere to surrounding surfaces and make it possible to carry out the operations involved for a longer period of time before cleaning the surrounding surfaces and thereby reduce maintenance costs.

Another object of the invention is to provide a process of the type described in which paint solids from electrodeposition paint wastes are treated so as to condition them and make it possible to separate the solids from waste water by filtration and, if desired, recycle the filtrate in the process.

Another object of the invention is to provide a process of the type described characterized by deposit control, longer runs, less maintenance, lower plant treatment costs and the production of a sludge from the electrodeposition paint waste waters which is more readily dewatered by filtration or otherwise than has been the case in conventional commercial operations. Other objects will appear hereinafter.

BRIEF SUMMARY OF THE INVENTION

In accordance with the invention pollution and contamination in waste water, including drippings and wash water, from articles painted by electrodeposition are controlled by adding to the waste water an acidic silica sol and a water dispersible coagulating polymer in an amount sufficient to reduce the tackiness of the paint solids and to condition such solids so that they can be separated from the water, for example, by filtration.

DETAILED DESCRIPTION OF THE INVENTION

In a process of the type described, the conventional aqueous coating electrodeposition paint bath in which the article to be painted is immersed usually contains about 5% to 15% by weight of solids including pigments and resinous binders. After the article has been painted and removed from the bath the drippings from the article likewise contain around 5% to 15% by weight of such solids. These drippings are usually diluted by wash water so that the amount of solids present in the combined waste water is much lower than the amount originally present in the electrodeposition bath, for example, say one-tenth as much. These solids, regardless of their concentration in the waste water, are normally very tacky and tend to adhere to all types of surfaces which they normally encounter. The waste water, including such solids can be disposed of as a waste material but in order to avoid contamination of the environment it is desirable to separate the solids and to re-use the water. Unfortunately, due to the tackiness of the paint solids they not only form deposits on surrounding surfaces but also it is difficult to separate the solids from the waste water by the usual methods of filtration.

In the practice of the present invention it has been found that the addition of an acidic silica sol and a water dispersible coagulating polymer to conventional electrodeposition paint waste waters of the type described which contain negatively charged pigment and resinous binder reduces the tendency of the paint solids in the waste water to adhere to surrounding surfaces and at the same time conditions the solids so that they can be readily removed from the water.

The separation of the solids from the water can be effected by vacuum filtration or in any other suitable manner and the filtrate can be used over again as a part of the water employed in washing the article to which the electrodeposited paint has been applied.

The preparation of colloidal silica sols is well known in the art and is described, for example, in U.S. Pat. Nos. 3,440,174, 3,462,374, 3,468,813, 3,538,015 and other patents cited therein. In general, silica sols are either cationic sols or anionic sols. In the cationic sols the particles are positively charged and in the anionic sols the particles are negatively charged. For the purpose of this invention any of the colloidal anionic silica sols can be used.

The silica sol is rendered acidic by adding thereto sulfuric acid, hydrochloric acid or any other suitable mineral acid. The amount of acid added is subject to variation but is preferably sufficient to produce a pH of about 5.

The water dispersible coagulating polymer is preferably a non-ionic or anionic water soluble polymer formed by the polymerization of at least one mono-olefinic compound through an aliphatic unsaturated group and having a molecular weight of at least 5000, preferably at least 100,000, and in some cases greater than 1,000,000. These polymers can be either homopolymers or copolymers and are characterized by a linear carbon chain to which is attached a plurality of non-ionic or anionic groups. A preferred example of a homopolymer is polyacrylamide obtained by the polymerization of acrylamide. Another example of a homopolymer is polyacrylic acid obtained by the polymerization of acrylic acid. Preferred copolymers are those obtained by the copolymerization of acrylamide and acrylic acid in varying proportions so that the molar ratios of amide groups to carboxy groups in the resultant copolymer are usually within the range of 15:85 to 85:15.

The water dispersible polymer can be added separately to the electrodeposition paint waste water or they can be premixed and added as a blend to the waste water.

In practicing the invention it is preferable to use a silica sol in which the silica particles in the colloidal silic sol have an average diameter within the range of 4 to 120 millimicrons ($M\mu$), preferably within the range of 15 to 50 $M\mu$. It is desirable that the aqueous colloidal silica sol contain at least 30% by weight colloidal silica and usually 40 to 50% by weight colloidal silica.

The colloidal silica sol can also contain minor amounts of organic liquids commonly used to prevent freezing which do not affect the stability of the sol. For example, it is permissible to use colloidal silica sols containing 5% to 10% ethylene glycol.

The amount of the aqueous colloidal silica sol added to the paint electrodeposition waste water coupled with the amount of water dispersible coagulating polymer should be sufficient to reduce the tackiness of the paint solids in the waste water and thereby reduce their tendency to deposit on surrounding surfaces and at the same time improve their filterability. In using a colloidal silica sol containing about 50% $SiO_2$ the quantity added to the waste water is usually within the range of 500 to 2000 parts per million (ppm) and preferably about 1000 ppm.

The amount of water dispersible polymer added to the waste water is usually within the range of 0.5 to 15 ppm and preferably about 2 ppm in the case of a polymer such as polyacrylamide.

The amount of the water dispersible coagulating polymer is usually within the range of 0.1% to 3% by weight of the silica in the silica sol.

In a process of this type it is usually customary to pump the waste water through conduits to settling tanks or to allow the waste water to flow by gravity into settling tanks and remove the water from the solids by decantation or by filtration or both. The silica sol and the water dispersible coagulating polymer can be introduced into the waste water at any suitable point, either separately or together, preferably just ahead of or after the pump.

The invention will be illustrated but is not limited by the following example in which the quantities are given in parts by weight unless otherwise indicated.

EXAMPLE

The process of the invention was carried out in an automobile body plant using an electrodeposition paint system of the type previously described wherein automobile bodies were immersed in an electrodeposition paint bath containing 5% to 15% by weight of solids including particulate pigment and polycarboxylic acid resin binder which were negatively charged. A direct current applied to the bath with the automobile body as the anode caused the paint to be applied and when the automobile body was removed from the bath the waste water, including the drippings and water used to wash the automobile body, was treated with 1000 ppm of an aqueous anionic colloidal silica sol (NALCO 1050) consisting essentially of 50% $SiO_2$ particles having an average diameter of about 20 millimicrons, 40% water, and 10% ethylene glycol, acidified to a pH of 5 with sulfuric acid and mixed with 2 ppm of the waste water of a polyacrylamide having an average molecular weight in excess of 100,000 (NALCOLYTE 670).

This treatment reduced the tackiness of the solids content in the waste water and reduced the tendency of said solids to adhere to the surrounding surfaces. The waste water was pumped to settling tanks where a portion of the solids was removed by settling and the supernatent layer was filtered to remove the remainder of the solids. The filtrate was recycled and used over again in removing the waste water from subsequently painted articles.

It will be recognized that the invention is subject to some variation and modification in the manner of its practical application particularly with respect to the specific water dispersible coagulating polymer. While it is preferred to use polyacrylamide polymers or copolymers of acrylic acid and acrylamide, other types of polymers may be employed including, for example, those disclosed in U.S. Pat. No. 3,549,527, the disclosure of which is incorporated herein and made a part hereof by reference. In general, the preferred anionic polymers are those containing hydrophilic groups from the class consisting of carboxylic acids, carboxylic acid anhydrides, and carboxy acid salt groups, or those containing said hydrophilic groups as well as amide groups derived from acrylamide.

The invention is hereby claimed as follows:

1. In a process for controlling pollution and contamination in the electrodeposition of paint from an aqueous paint bath on articles in which waste water including paint drippings from such articles and water used to wash said articles after they have been painted contains negatively charged paint solids which are tacky, the improvement which consists essentially of adding to said waste water a quantity of an acidic anionic silica sol and a water dispersible coagulating anionic or non-ionic polymer sufficient to reduce the tackiness of the paint solids in said waste water and sufficient to condition said solids so that they can be separated from said water, said water dispersible polymer having an average molecular weight of at least 5000 and having a linear carbon chain to which is attached a plurality of groups selected from the group consisting of anionic groups and non-ionic groups, the proportions of said silica sol corresponding to 500 to 2000 parts by weight of a silica sol containing 30% to 50% by weight $SiO_2$ per million parts of said waste water and the proportions of said polymer corresponding to 0.5 to 15 parts by weight per million parts of said waste water, and separating said solids from the water.

2. A process as claimed in claim 1 in which the treatment of said waste water is carried out under acidic conditions.

3. A process as claimed in claim 1 in which said anionic groups and non-ionic groups are selected from the group consisting of amide, carboxylic acid, carboxylic acid anhydride and carboxy acid salt groups.

4. A process as claimed in claim 1 in which said coagulating polymer is a polyacrylamide.

5. A process as claimed in claim 1 in which said polymer is a copolymer of acrylamide and acrylic acid in proportions such that the molar ratios of amide groups to carboxy groups in the resultant copolymer are within the range of 15:85 to 85:15.

6. A process as claimed in claim 1 in which said water dispersible polymer has an average molecular weight of at least 100,000.

* * * * *